US012701370B2

(12) United States Patent
Ho

(10) Patent No.: US 12,701,370 B2
(45) Date of Patent: Aug. 4, 2026

(54) BONE CONDUCTION HEARING AID WITH FEEDBACK PREVENTION FUNCTION

(71) Applicant: OXTI Pte Ltd, Singapore (SG)

(72) Inventor: Chih-Feng Ho, Singapore (SG)

(73) Assignee: OXTI PTE LTD, Singapore (SG)

( * ) Notice: Subject to any disclaimer, the term of this patent is extended or adjusted under 35 U.S.C. 154(b) by 161 days.

(21) Appl. No.: 18/830,605

(22) Filed: Sep. 11, 2024

(65) Prior Publication Data

US 2026/0075368 A1 Mar. 12, 2026

(51) Int. Cl.
*H04R 25/00* (2006.01)

(52) U.S. Cl.
CPC ......... *H04R 25/456* (2013.01); *H04R 25/305* (2013.01); *H04R 25/602* (2013.01); *H04R 25/603* (2019.05); *H04R 2225/61* (2013.01); *H04R 2460/13* (2013.01)

(58) Field of Classification Search
CPC ........ H04R 3/02; H04R 25/45; H04R 25/453; H04R 25/456; H04R 25/603; H04R 2225/61; H04R 2460/13
See application file for complete search history.

(56) References Cited

U.S. PATENT DOCUMENTS

2014/0193010 A1* 7/2014 Goll ........................ H04R 25/45
381/318

* cited by examiner

*Primary Examiner* — Kile O Blair
(74) *Attorney, Agent, or Firm* — Leong C. Lei

(57) ABSTRACT

Disclosed is a bone conduction hearing aid with a whistle prevention function, including two shells and a connection part attached to opposing sidewalls of the shells. An upper part of the connection part is arc-shaped. Each shell includes a headphone arranged on an inward-facing side. A partition is horizontally set in the middle of the shell. A power source is arranged on one side of a bottom of the partition. An assistive microphone is located on one side of the power source and extends through to the outside. A main controller is arranged on an opposite side of the bottom of the partition. A whistle monitoring and protection mechanism is located in the middle of the partition to fulfill whistle monitoring during use of the hearing aid. A whistle sensor, upon detecting a whistle, transmits a signal to the main controller to selectively cuts off the assistive microphones or headphones.

8 Claims, 3 Drawing Sheets

BONE CONDUCTION HEARING AID WITH FEEDBACK PREVENTION FUNCTION

BACKGROUND OF THE INVENTION

(a) Technical Field of the Invention

The present invention relates a smart wearable device, and more particularly to a bone conduction hearing aid with a whistle prevention function.

(b) Description of the Prior Art

With the rapid development and maturity of smart hardware technology, smart headphones have begun to enter the living of general people. Existing headphones typically use air conduction technology, which can lead to feedback issues and poor sound transmission, resulting in suboptimal hearing aid effects and user experience.

Chinese Patent Document CN210431880U, which relates to the field of smart wearable devices, discloses a bone conduction hearing aid with a whistle prevention function. The hearing aid includes an ear hook, a rear hook, a battery, a microprocessor, control buttons, a bone conduction module, a Bluetooth module, a Bluetooth microphone, and at least two hearing microphones. The hearing microphones have pickup holes that are arranged on a side of a main control part in a non-parallel manner. The Bluetooth module is positioned outside the main control part, and the pickup holes of the hearing microphones are arranged, in a non-parallel manner, on the side of the main control part. A soft rubber sleeve is placed between the two hearing microphones.

Existing bone conduction hearing aids having a whistle prevention function suffer the following drawbacks. They are generally cumbersome to wear and cannot detect and eliminate whistle noise during use. They rely solely on external components for protection, thus providing unsatisfactory effect of hearing aid and user experience.

SUMMARY OF THE INVENTION

An objective of the present invention is to provide a bone conduction hearing aid with a whistle prevention function, which includes a whistle monitoring and protection mechanism that allows for whistle detection during the use of the bone conduction hearing aid. The whistle sensor, upon detecting a whistle, transmits a signal to a main controller, which can then selectively cut off an assistive microphone or a headphone to prevent the whistle from escalating. The present invention solves the problems that the existing bone conduction hearing aids with whistle prevention functions are cumbersome to wear and unable to detect and eliminate whistles during use and rely only on external components for protection, leading to the performance of the hearing aid and user experience being unsatisfactory.

The bone conduction hearing aid with a whistle prevention function according to an embodiment of the present invention comprises two shells that are arranged parallel to each other. The two shells have sidewalls that face away from each other and are connected by a connecting part. An upper part of the connecting part is arc-shaped. Each shell has a headphone mounted on an inward-facing side thereof. A partition is horizontally positioned in the middle of each of the shells. A power source is arranged on one side of a bottom of the partition, and an assistive microphone is arranged at one side of the power source. The assistive microphone extends through a wall of the shell to the outside. A main controller is arranged on an opposite side of the bottom of the partition. The middle of the partition is provided with a whistle monitoring and protection mechanism, which is connected to the main controller. The main controller is connected to the headphone, the power source, and the assistive microphone.

Further, the whistle monitoring and protection mechanism comprises sleeves positioned on two sides of the middle of the partition. Each of the sleeve comprises fixing blocks arranged at upper and lower connections thereof with the partition. Each of the sleeves comprises a connecting rod extending therethrough.

Further, the connecting rod of each of the sleeves is fitted with a baffle on an outer wall thereof, and the baffle is provided, at a bottom end thereof, with a first spring arranged on the outer wall of the connecting rod. The first spring is fixed to a bottom wall of the sleeve.

Further, the connecting rod of each of the sleeves has a top end on which a sliding seat is mounted, and the sliding seat is formed, in a bottom thereof, with a groove matching the top end of the connecting rod. The groove is provided with a second spring mounted to an inner wall thereof.

Further, the second spring is provided, on an end thereof, with a limit plate, and the limit plate is located in a limit slot formed in a bottom wall of the groove. A connecting sleeve is provided between bottom walls of the two sliding seats.

Further, an inner wall of the connecting sleeve and opposite outer walls of the two sliding seats are equipped with a whistle sensor, which is connected to the main controller.

Further, each of the sliding seats is provided, on a top thereof, with a handle shaped like the figure "7".

Further, each of the shells is provided, on a top thereof, with a hinge, of which an end is connected to an upper cover.

Compared to the prior art, the beneficial effects of the present invention are as follows:

(1) The whistle monitoring and protection mechanism allows for whistle detection during the use of the hearing aid. The whistle sensor, upon detecting a whistle, transmits a signal to the main controller, which can then cut off the assistive microphone or the headphone to prevent the whistle from escalating. Additionally, the baffles on the sliding seats move the connecting rods so as to cause the first springs on the outer walls of the connecting rods to retract. The limit plates and the second springs work to block and eliminate the generated whistle. The reciprocating movements of the first and second springs help reduce damage to the whistle sensor and provides fall protection so as to extend the lifespan of the hearing aid.

(2) The present invention uses the connecting part to attach the two shells to the ears of a user and holds the connecting part in place on the scalp of the user to achieve a secure fit. The direction of the assistive microphone is towards the face of user so as to facilitate amplification of sounds received from the opposite side and transmits them to the headphones, enhancing the usability of the hearing aid.

BRIEF DESCRIPTION OF THE DRAWINGS

The drawings are provided to facilitate a further understanding of the present invention and form part of the specification. They are used to explain the embodiments of the present invention and do not constitute limitations. In the drawings.

DETAILED DESCRIPTION OF THE PREFERRED EMBODIMENTS

Figure 1:
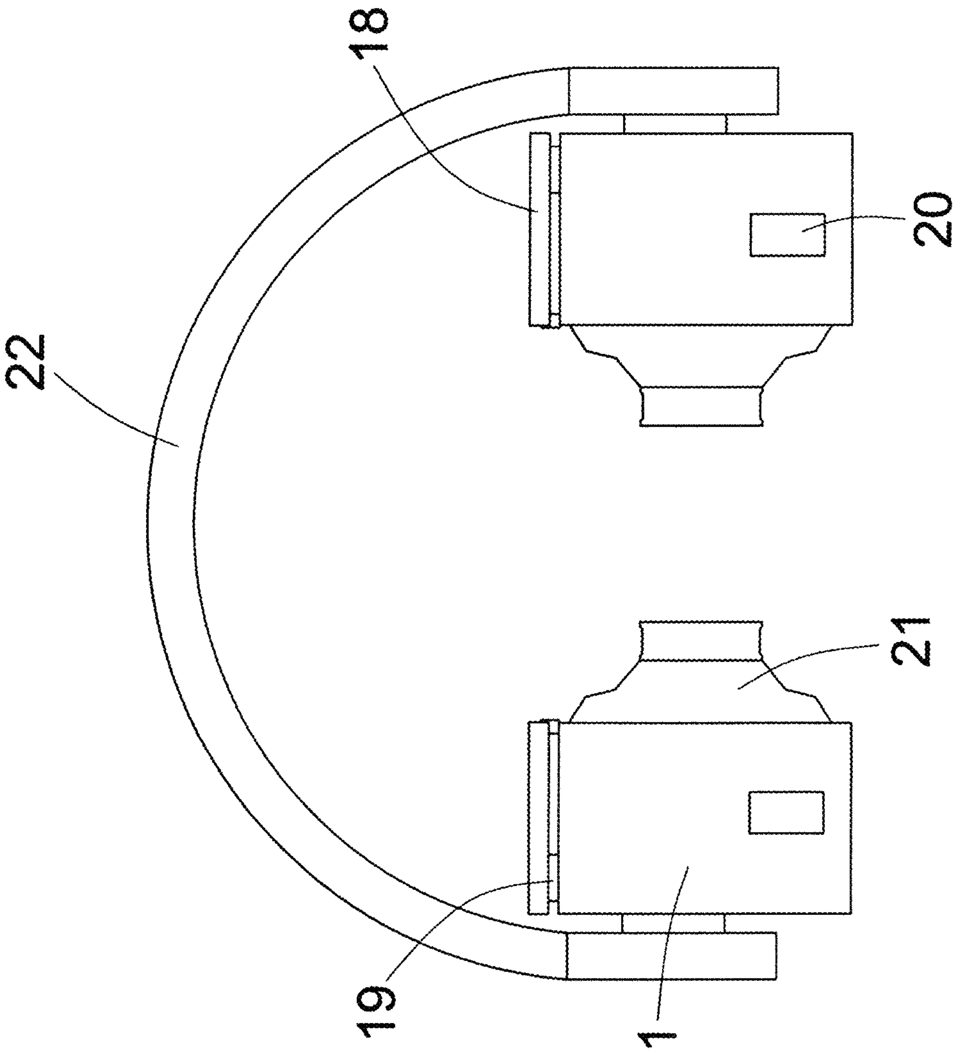
FIG. 1 is a schematic structural diagram of a bone conduction hearing aid with a feedback prevention function according to the present invention.

To make the objectives, technical solutions, and advantages of the present invention clearer, the following detailed description is provided with reference to the accompanying drawings and embodiments. It should be understood that the specific embodiments described herein are merely for illustrating the present invention and are not intended to limit the present invention.

The following is a detailed description of the implementation of the present invention based on specific embodiments.

In the drawings of the embodiment, identical or similar reference numbers correspond to the same or similar components. In the description of the present invention, terms such as "upper," "lower," "left," "right," and so on, indicate positional or directional relationships based on the orientation shown in the drawings. These terms are for convenience of description and simplification and do not imply or suggest that the described devices or components must have specific orientations or configurations. Therefore, the positional terms used in the drawings are illustrative only and should not be construed as limitations. Skilled persons in the art can understand the specific meanings of these terms based on the context.

Figure 2:
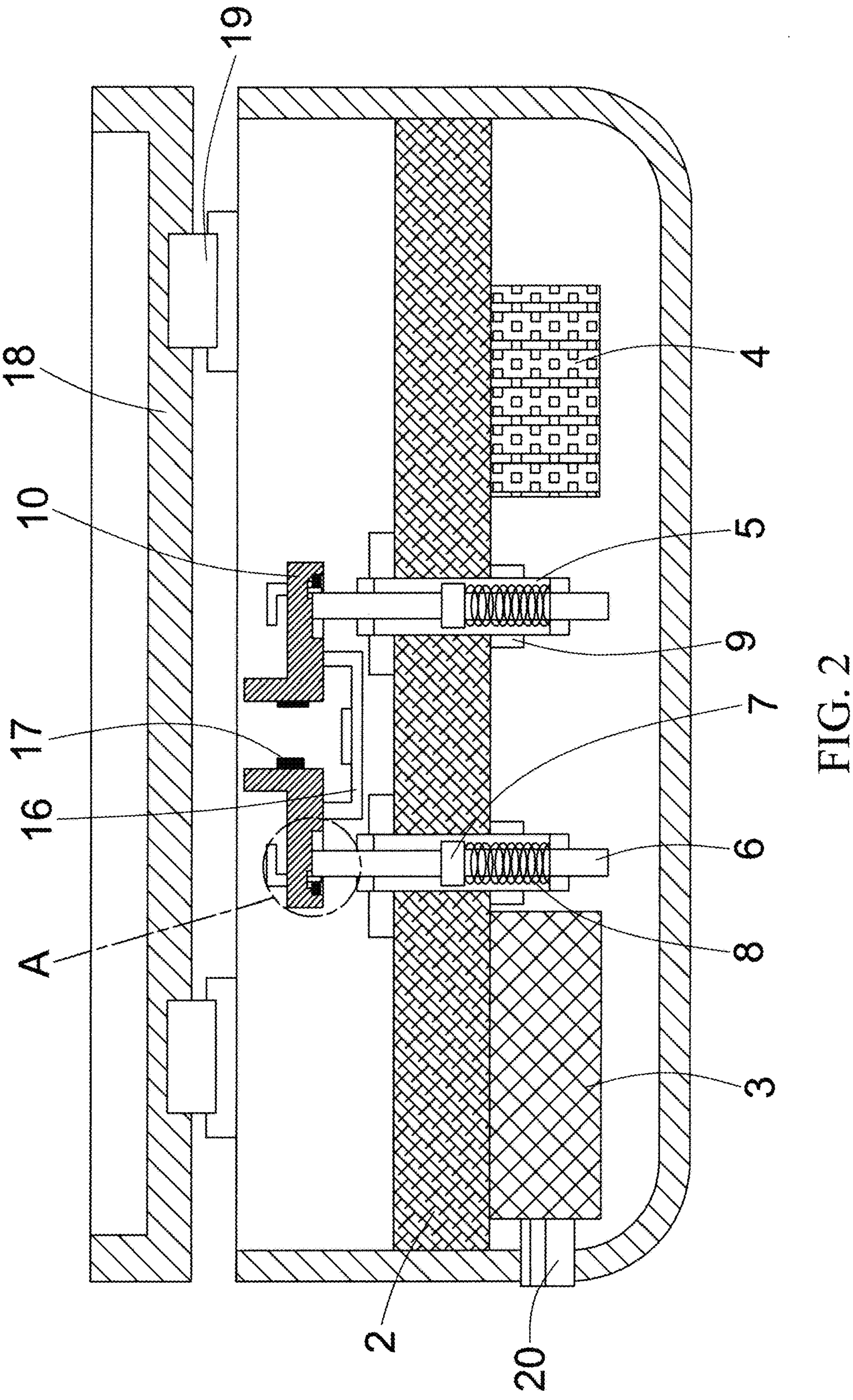
FIG. 2 is a side view, in a sectioned form, showing an internal structure inside a shell of the bone conduction hearing aid with a feedback prevention function according to the present invention.
Figure 3:
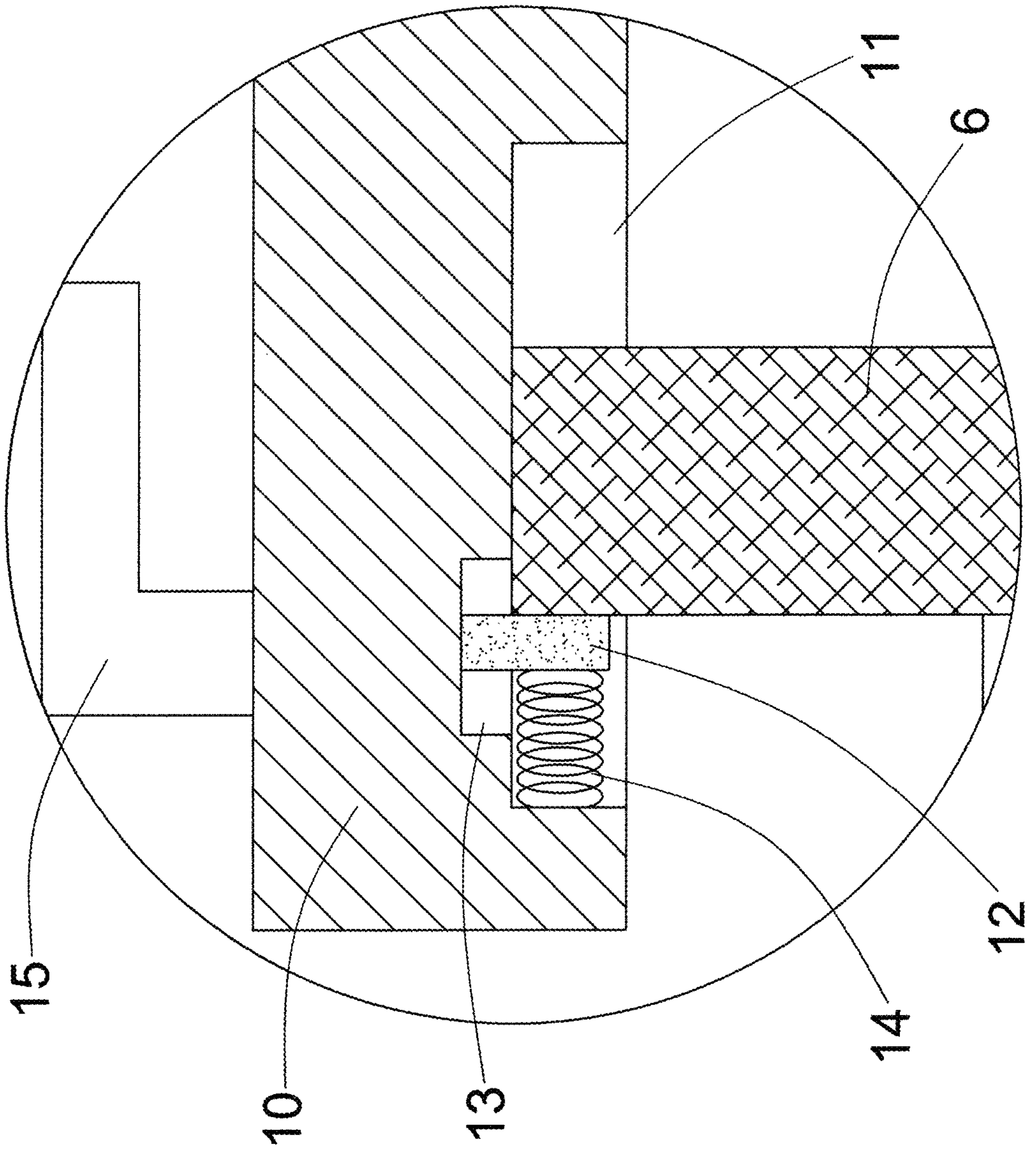
FIG. 3 is an enlarged view of an encircled region "A" of FIG. 2.

Referring to FIGS. 1-3, a preferred embodiment of a bone conduction hearing aid with a feedback prevention function according to the present invention is provided.

The bone conduction hearing aid comprises two shells 1 that are arranged parallel to each other, and a connecting part 22 connecting sidewalls of the two shells 1 that face away from each other. An upper part of the connecting part 22 is arc-shaped. Each of the shells 1 comprises a headphone 21 mounted on an inward-facing side thereof. A partition 2 is horizontally positioned in the middle of each of the shells 1. On one side of a bottom of the partition 2, a power source 3 is arranged, and an assistive microphone 20 is arranged at one side of the power source 3. The assistive microphone 20 extends through a wall of the shell 1 to the outside. On an opposite side of the bottom of the partition 2, a main controller 4 is arranged. Mounted in a middle of the partition 2 is a whistle monitoring and protection mechanism, which is connected to the main controller 4. The main controller 4 is connected to the headphone 21, the power source 3, and the assistive microphone 20. The whistle monitoring and protection mechanism allows for whistle detection during use. A whistle sensor 17 is arranged to detect a whistle and sends a signal to the main controller 4, which can then cut off the assistive microphone 20 or headphone 21 to prevent the whistle from escalating.

In the instant embodiment, the whistle monitoring and protection mechanism comprises sleeves 5 positioned on two sides of the middle of the partition 2. Each of the sleeves 5 comprises fixing blocks 9 arranged at upper and lower connections thereof with the partition 2, and each of the sleeves 5 comprises a connecting rod 6 extending therethrough. The connecting rod 6 is arranged in the corresponding one of the sleeves 5 and is fitted with a baffle 7 on an outer wall thereof. The outer wall of the connecting rod 6 is provided, at a bottom end of the baffle 7, with a first spring 8, and the first spring 8 is fixed, at an opposite end thereof, to a bottom wall of the corresponding sleeve 5. The connecting rod 6 has a top end on which a sliding seat 10 is mounted, and the sliding seat 10 is formed, in a bottom thereof, with a groove 11 that matches the top end of the connecting rod 6. The groove 11 is provided with a second spring 14 mounted to an inner wall thereof. The second spring 14 is equipped with a limit plate 12 at a distal end thereof. The limit plate 12 is located in a limit slot 13 that is formed in a bottom wall of the groove 11. A connecting sleeve 16 is provided between bottom walls of the two sliding seats 10. An inner wall of the connecting sleeve 16 and opposite outer walls of the two sliding seats 10 are provided with a whistle sensor 17, which are connected to the main controller 4. Reciprocating movements of the first springs 8 and second springs 14 help reduce damage to the whistle sensor 17 and provide fall protection, so as to extend the lifespan of the bone conduction hearing aid.

In the instant embodiment, each of the sliding seats 10 is provided, on a top thereof, with a handle 15 shaped like the figure "7," which facilitates the separation and detection of the whistle sensor 17.

In the instant embodiment, each end of a top of each of the shells 1 is equipped with a hinge 19, of which an end is connected to an upper cover 18 so as to allow the shell 1 to be opened for internal component replacement.

The present invention uses the connecting part 22 to attach the two shells 1 to the ears of a user and the connecting part 22 is kept in place on the scalp of the user to ensure a secure fit. The direction of the assistive microphones 20 is towards the face of the user, facilitating amplification of sounds received from the opposite sides and transmitting the sounds to the headphones 21, thereby enhancing the usability of the bone conduction hearing aid. The whistle prevention is achieved through the whistle monitoring and protection mechanism. The whistle sensor 17, upon detecting a whistle, transmits a signal to the main controller 4, which can cut off the assistive microphone 20 or headphone 21 to prevent the whistle from escalating. Bumps on the two sliding seats 10 press the connecting rods 6, causing the first springs 8 that are arranged on the outer walls of the connecting rods 6 to retract. The limit plates 12 and the second springs 14 work to block and eliminate the generated whistle. The reciprocating movements of the first and second springs 8, 14 help reduce damage to the whistle sensor 17 and provide fall protection so as to extend the lifespan of the bone conduction hearing aid.

In the instant embodiment, the entire operation process can be controlled by a computer or a programmable logic controller (PLC) in order to fulfill automated operation control. Signal feedback can be implemented through the whistle sensor to ensure sequential execution of steps. These are conventional automation control techniques and will not be detailed further herein.

Any aspects of the present invention not described in detail are considered common knowledge in the field of technology.

Although the embodiments of the present invention have been shown and described, it should be understood by those skilled in the art that various modifications, alterations, substitutions, and variations can be made without departing from the principles and spirit of the present invention. The scope of the present invention is defined by the appended claims and their equivalents.

I claim:

1. A bone conduction hearing aid with a whistle prevention function, comprising two shells that are arranged parallel and a connection part connecting sidewalls of the two shells, an upper part of the connection part being arc-shaped, each of the two shells comprising a headphone mounted on an inward-facing side thereof, a partition being horizontally set in a middle of each of the two shells, a power source being arranged on one side of a bottom of the partition, an assistive microphone being at one side of the power source and extending through a wall of the shell to the outside, a main controller being arranged on an opposite side of the bottom of the partition, a whistle monitoring and protection mechanism being mounted in the middle of the partition, the whistle monitoring and protection mechanism being connected to the main controller, the main controller being connected to the headphone, the power source, and the assistive microphone.

2. The bone conduction hearing aid with a whistle prevention function according to claim 1, wherein the whistle monitoring and protection mechanism comprises sleeves positioned on two sides of the middle of the partition, and each of the sleeves comprises fixing blocks arranged at upper and lower connections thereof with the partition, each of the sleeves comprising a connecting rod extending therethrough.

3. The bone conduction hearing aid with a whistle prevention function according to claim 2, wherein the connecting rod of each of the sleeves is fitted with a baffle on an outer wall thereof, the baffle being provided, at a bottom end thereof, with a first spring arranged on the outer wall of the connecting rod, the first spring being fixed to a bottom wall of the sleeve.

4. The bone conduction hearing aid with a whistle prevention function according to claim 3, wherein the connecting rod of each of the sleeves has a top end on which a sliding seat is mounted, and the sliding seat is formed, in a bottom thereof, with a groove matching the top end of the connecting rod, the groove being provided with a second spring mounted to an inner wall thereof.

5. The bone conduction hearing aid with a whistle prevention function according to claim 4, wherein the second spring is provided, on an end thereof, with a limit plate, and the limit plate is located in a limit slot formed in a bottom wall of the groove, a connecting sleeve being provided between the two sliding seats.

6. The bone conduction hearing aid with a whistle prevention function according to claim 5, wherein an inner wall of the connecting sleeve and opposite outer walls of the two sliding seats are equipped with a whistle sensor, which is connected to the main controller.

7. The bone conduction hearing aid with a whistle prevention function according to claim 6, wherein each of the sliding seats is provided, on a top thereof, with a handle shaped like the figure "7".

8. The bone conduction hearing aid with a whistle prevention function according to claim 7, wherein each of the shells is provided, on a top thereof, with a hinge, of which an end is connected to an upper cover.

* * * * *